United States Patent [19]
Dais et al.

[11] Patent Number: 5,524,213
[45] Date of Patent: Jun. 4, 1996

[54] METHOD OF STRUCTURING MESSAGES FOR EXCHANGING DATA AND/OR FOR SYNCHRONIZING PROCESSES IN A DATA PROCESSING SYSTEM WHEREIN AT LEAST TWO STATIONS ARE CONNECTED TO EACH OTHER VIA A SERIAL BUS

[75] Inventors: Siegfried Dais, Gerlingen; Jan Unruh, Stuttgart, both of Germany

[73] Assignee: Robert Bosch GmbH, Stuttgart, Germany

[21] Appl. No.: 378,013

[22] Filed: Jan. 25, 1995

Related U.S. Application Data

[63] Continuation of Ser. No. 859,880, Mar. 30, 1992, abandoned.

[30] Foreign Application Priority Data

Mar. 28, 1991 [DE] Germany ............................ 41 10 428.5
Sep. 3, 1991 [DE] Germany ............................ 41 29 205.7

[51] Int. Cl.$^6$ .............................. H04J 3/16; G05B 19/04; H04Q 11/04
[52] U.S. Cl. ............................... 395/200.170; 370/85.600; 370/82; 340/825.500; 364/242.800
[58] Field of Search ..................................... 395/800, 200, 395/325, 200.12, 200.16, 200.17, 421.02; 370/60, 82, 83, 85.6; 340/825.5, 825.51; 364/230.1, 242.7, 242.8, 941.2, 941.3, 941.6

[56] References Cited

U.S. PATENT DOCUMENTS

| | | | |
|---|---|---|---|
| 4,519,068 | 5/1985 | Krebs et al. | 370/82 |
| 4,621,362 | 11/1986 | Sy | 370/85.14 |
| 4,823,345 | 4/1989 | Daniel et al. | 371/37.1 |
| 4,922,486 | 5/1990 | Lidinsky et al. | 370/60 |
| 4,975,952 | 12/1990 | Mabey et al. | 380/49 |
| 5,001,642 | 3/1991 | Botzenhardt et al. | 364/431.12 |
| 5,127,040 | 6/1992 | D'Avello et al. | 379/58 |
| 5,309,436 | 5/1994 | Hirano et al. | 340/825.5 |
| 5,319,641 | 6/1994 | Fridich et al. | 370/85.6 |
| 5,343,472 | 8/1994 | Michihira et al. | 370/85.6 |

FOREIGN PATENT DOCUMENTS

| | | |
|---|---|---|
| 0237839 | 9/1987 | European Pat. Off. |
| 0399491 | 11/1990 | European Pat. Off. |
| 2574236 | 6/1986 | France |
| 4029290 | 3/1991 | Germany |

OTHER PUBLICATIONS

ISO Document ISO/TC22/SC3 N608E (Jan. 1991), "Road Vehicles–Interchange of digital information–Controller Area Network (CAN) for high speed commmunication".
FORD "Standard Corporate Protocol", Version 1.0, Apr. 1989.
ISO/TC22/SC3/WG1 N429E (Oct. 1990), "Serial Data Communication".

*Primary Examiner*—Alyssa H. Bowler
*Assistant Examiner*—Mark H. Rinehart
*Attorney, Agent, or Firm*—Walter Ottesen

[57] ABSTRACT

The invention is directed to a method for structuring messages for the exchange of data and/or for the synchronization of processes in data processing systems. A message includes at least elements with respect to start (start-bit, SOF), identification (also called identifier) and data with one bit field (IDE-field, IDE-bit) having at least one bit for characterizing the length of the identifier.

11 Claims, 7 Drawing Sheets

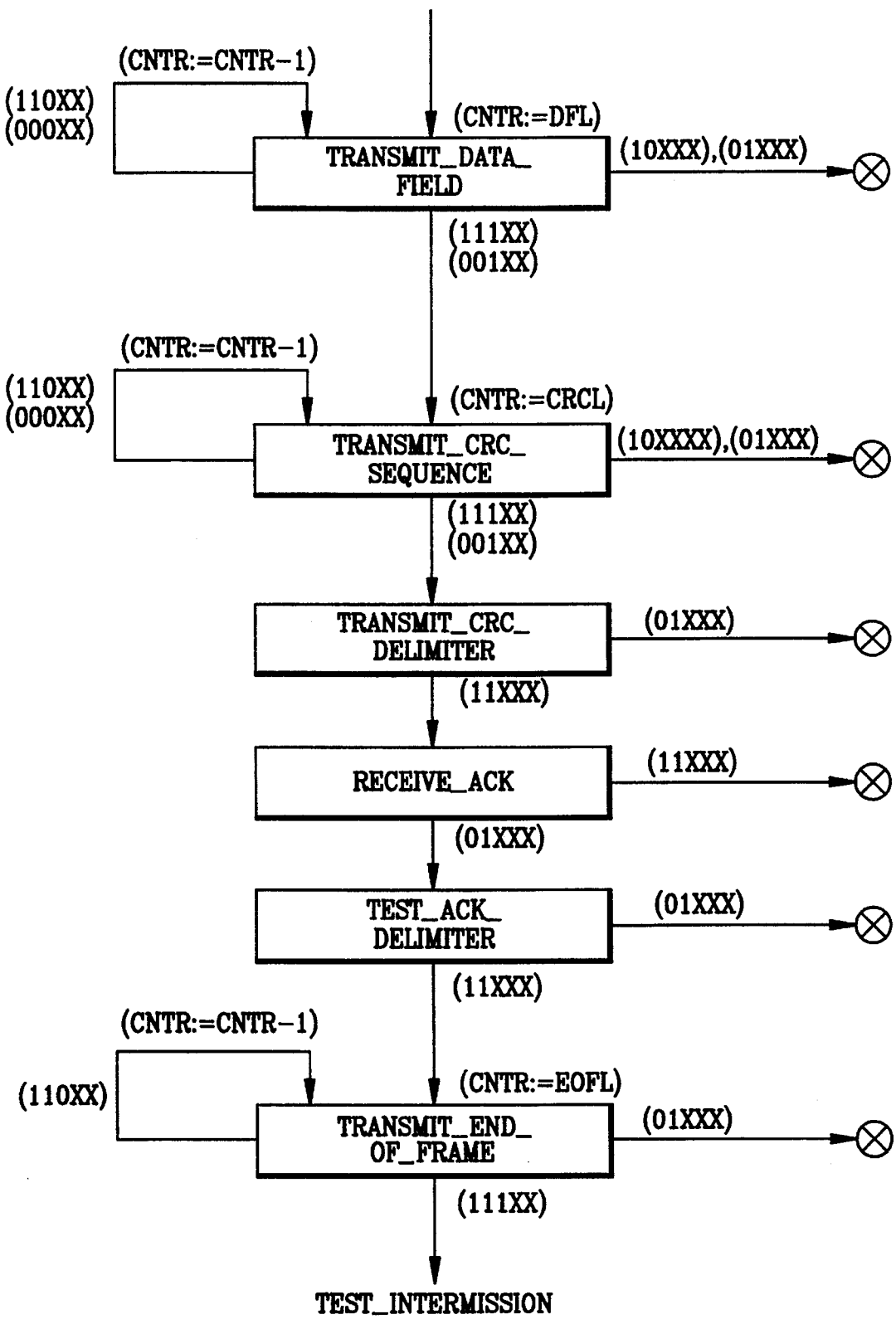
FIG. 5b  ⊗ ERROR HANDLING

METHOD OF STRUCTURING MESSAGES FOR EXCHANGING DATA AND/OR FOR SYNCHRONIZING PROCESSES IN A DATA PROCESSING SYSTEM WHEREIN AT LEAST TWO STATIONS ARE CONNECTED TO EACH OTHER VIA A SERIAL BUS

This is a continuation of application Ser. No. 07/859,880, filed Mar. 30, 1992, now abandoned.

Process control takes place especially in motor vehicles, industrial robots, medical monitoring and analyzing apparatus, elevator systems and the like. In recent years, the data exchange for this process control between the individual open-loop and closed-loop control units has taken place increasingly with the aid of methods for serial data exchange.

In practice, and with respect to controlling priority for the allocation of the serial bus interconnecting the open-loop and closed-loop control units and/or the characterization of the messages transmitted via the serial bus, especially two classes of protocols have been formed, namely:

(1) protocols having messages with short identifiers, that is, messages which have available a small number of, for example, 11 bits for coding different priorities and/or names. One such protocol is known from U.S. Pat. No. 5,001,642 and the ISO document ISO/TC22/SC3 N 608 E (CAN-protocol); and, (2) protocols having messages having long identifiers, that is, messages which have a greater number of bits such as 32, for coding different priorities and/or names. One such protocol is known from the publication FORD "Standard Corporate Protocol", version 1.0, April 1989, ISO/TC22/SC3/WG1N 429 E.

No protocol which combines both possibilities was known and, for this reason, the user has to decide on a protocol of one or the other class pursuant to the present state of the art.

Because of the short identifiers, protocols of the first class are characterized in that the overall length of the associated message with reference to the number of required bits can be short. For a given bit rate, this permits a large number of messages to be transmitted per unit of time. The high efficiency stands in contrast to the disadvantage of a correspondingly limited input possibility of priorities for the allocation of the serial bus and/or names for characterizing the messages to be transmitted.

Because of the long identifiers, protocols of the second class are characterized in that also the total length of the corresponding message with respect to the number of required bits is in each case long. For a given bit rate this has the consequence that only a significantly lower number of messages can be transmitted per unit of time compared to messages having shorter identifiers. This low efficiency is in contrast to the advantage of a correspondingly wide variation with respect to the possibility of authorizing priorities for the allocation of the serial bus and/or of names for characterizing the messages to be transmitted.

As noted in the description of the state of the art, no protocol is known which, in dependence upon the optimization target determined by the application, permits the selection-free use of messages having short or long identifiers in such a manner that these messages can be transmitted in any desired sequence over the same serial bus.

It is therefore not possible within one serial bus system to select in the context of messages (by the selection of short and/or long identifiers) the optimum between transmitting capacity and priority space/name space.

SUMMARY OF THE INVENTION

It is an object of the invention to provide a method for operating a data-processing system as well as a method for structuring messages which is flexible with respect to the particular requirements.

The method according to the invention affords the advantage with respect to the state of the art that within one and the same bus system messages having identifiers of different length can be transmitted consistently and free of interaction with one and the same protocol.

In this way, each individual message can be allocated an identifier having a length determined by the application. Thus, in the case of reduced requirements with respect to the length of the identifier, basically not more transmission capacity than is needed is utilized and, on the other hand, higher requirements with respect to the length of the identifier can be individually covered at the message level.

These classes of identifiers are supported in the method of the invention by one and the same protocol in one and the same bus system.

Especially one embodiment of the invention provides that all classes of identifiers can each structure a linear unsegmented priority space and/or name space. It is not necessary that the identifiers in the messages be transmitted uninterruptedly via the serial bus. The size of these priority spaces and/or name spaces is determined by the lengths of the particular identifiers.

BRIEF DESCRIPTION OF THE DRAWINGS

The invention will now be described with reference to the drawings wherein:

FIG. 4b is a continuation of the state diagram of FIG. 4a;

FIG. 5b is a continuation of the state diagram of FIG. 5a;

DESCRIPTION OF THE PREFERRED EMBODIMENTS OF THE INVENTION

Figure 1:
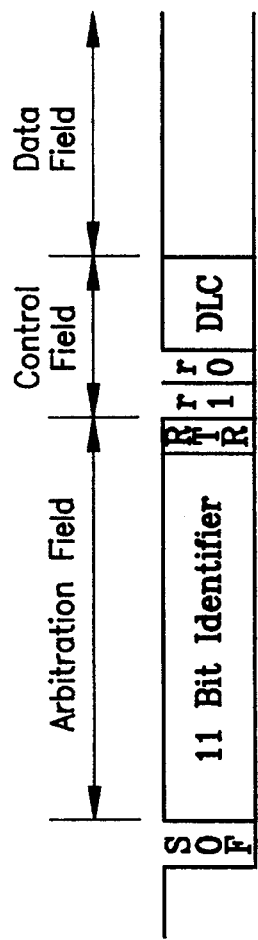
FIG. 1 is a segment of a message of a CAN-protocol known per se according to the publication entitled "Controller Area Network (CAN)" for ISO/TC22/SC3 N 608 E comprising the following bit fields: start-of-frame, arbitration field, control field and data field.

FIG. 1 shows a segment of a message according to the definition of the CAN-protocol known to date.

The 11-bit long identifier and the RTR conjointly comprise the arbitration field. The arbitration field is so defined that it includes precisely those bits which are utilized for the unequivocal decision as to bus allocation in the case of several messages competing for the bus. When the transmission of several messages begins simultaneously, then the determination is made during the transmission of the arbitration field as to which message is to receive the bus allocation. After the arbitration field is transmitted, precisely one message remains which is now transmitted to its end. Reserved bits r1 and r0 follow after the arbitration field which are dominantly transmitted in accordance with the determination of the CAN-protocol.

Figure 2:
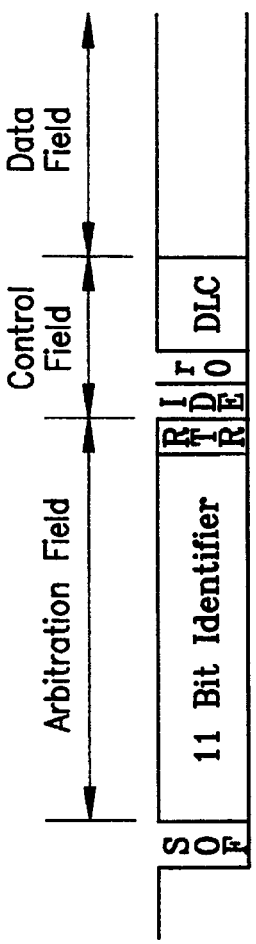
FIG. 2 is a segment of a message of a protocol according to the invention structured on the known CAN-protocol with the protocol of the invention permitting short and long identifiers comprised of start-of-frame, arbitration field having a short identifier, control field and data field.

FIG. 2 shows a segment of a message in standard format of the protocol according to the invention, that is, in an exemplary configuration having for example an 11-bit identifier. The standard format described in FIG. 2 is distinguished from the format of a message described in FIG. 1 according to the definition of the CAN-protocol by the supplementation by an IDE-field which has at least one bit.

Figure 3:
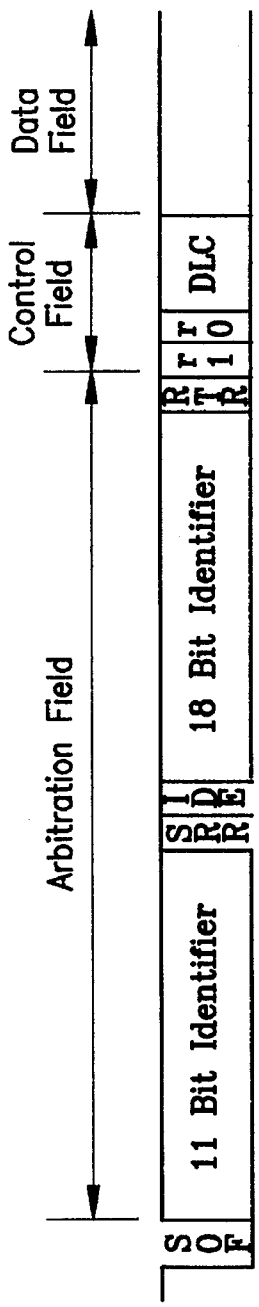
FIG. 3 is a segment of a message of a protocol according to the invention structured on the CAN-protocol which permits short and long identifiers with the protocol comprising start-of-frame, arbitration field having a long identifier, control field and data field.

The IDE-field is applied in the protocol according to the invention for deciding as to the bus allocation in that it permits messages in the standard format to be distinguished from messages in the extended format (see FIG. 3). The IDE-field is according to the definition of the arbitration field therefore a part of the arbitration field.

For definitions of the arbitration field which deviate from the foregoing, the IDE-field can be also allocated to another bit field without changing the function.

In the embodiment shown in FIG. 2, the IDE-field is represented by a bit (hereinafter referred to as the IDE-bit). The bit position of the IDE-bit in FIG. 2 corresponds to the position of the reserved bit r1 in FIG. 1. In standard format, the IDE-bit is transmitted dominantly precisely as r1. Accordingly, in the embodiment, the standard format according to FIG. 2 and the message format according to FIG. 1 are identical. An incorporation of the r0-bit according to FIG. 1 in the IDE-field is likewise possible.

FIG. 3 shows the segment of a message in the extended format of the protocol according to the invention.

In lieu of the RTR-bit in FIG. 2, an SRR-bit is disposed at the corresponding position. The IDE-bit which follows the latter is at the same bit position as in the standard format; however, in contrast to the definition of the standard format, is recessively transmitted.

The second portion of the identifier follows the IDE-bit and has a length in FIG. 3 which is given by 18 bits. In lieu of the length 18 also smaller and larger lengths are selectable, for example, 19 or 21 or another value. The total length of the identifier would then not be 29 as in FIG. 3; instead, 30 or 32 or a corresponding other value. The RTR-bit as well as the reserved bits r1, r0 follow after the second portion of the identifier.

These three bits correspond precisely to the three bits following the identifier in FIG. 1. The significance of these three bits is disclosed in U.S. Pat. No. 5,001,642 incorporated herein by reference. The bits r1 and/or r0 could also be deleted without the function of the protocol of the invention being endangered since r1 and r0 are reserved bits and therefore not functionally occupied.

As known from the CAN-protocol, the protocol according to FIGS. 2 and 3 also utilizes two-bit state with the characteristics dominant and recessive with a dominant bit overwriting a recessive bit transmitted at the same time. The IDE-field or IDE-bit serves to characterize the length of the identifier utilized in the particular message.

For the position of this field within messages having a short identifier, all positions within the arbitration field referred to the standard format according to the invention (FIG. 2) are applicable.

The continuous numbering (starting from SOF) of the bit positions in messages having short identifiers results in numbers for the bits of the IDE-field. This continuous numbering determines also in messages having long identifiers (with similar continuous numbering of the bit positions) the position of the bits of the IDE-field.

In this embodiment, the last possible bit position behind the RTR-bit is selected for the bit position of the IDE-bit. In dependence upon the requirement, each bit position ahead of the RTR-bit according to FIG. 2 or ahead of the SRR-bit according to FIG. 3 is advantageous which lies behind the start-of-frame.

In lieu of the RTR-bit shown in FIG. 2, there is the SRR-bit in FIG. 3. In the embodiment, this SRR-bit is transmitted always with recessive level in the extended format according to the invention.

If the transmission of messages in the standard format and messages in the extended format is started simultaneously and the first 11 bits of the identifiers of the messages in the extended format correspond to the identifiers of the messages in the standard format, then this selection of the SRR-bit has as a consequence that in the end, a message in the standard format has a higher priority than the messages in the extended format.

Thus, when there is coincidence of the first 11 bits of a long identifier with the corresponding bits of a short identifier, then that message has precedence which leads to higher transmitting efficiency based on the short identifier.

This applies independently on whether the messages in the standard format and the messages in the extended format are data frames or remote frames, that is, it applies for all four possible combinations.

The above-described determination of the SRR-bit ensures that the bus allocation is determined exclusively by the identifier and therefore by the assigned priority space and/or name space.

The RTR-bit as distinguishing feature between data frames and remote frames therefore has no influence on the priority relationship with reference to the classes between long and short identifiers.

As a departure from the illustrated embodiment, if the SRR-bit is defined for messages in extended format as always dominant, then the following results: when the transmission of messages in standard format and of messages in extended format is begun simultaneously and the first 11 bits of the identifier of the messages in the extended format correspond to the identifier of the messages in the standard format then this selection of the SRR-bit has the consequence that in the end, a message in extended format takes precedence over remote frames in standard format; whereas, data frames in standard format take precedence over messages in extended format.

The freely selectable use of messages having short and long identifiers permits an especially advantageous application for such process controls having distributed open-loop and closed-loop control units which is characterized in that one of the units triggers by means of a single message having a short identifier a group of processes in several units and, as a consequence, that these units and/or processes return messages having in each case long identifiers to the triggering unit.

An especially advantageous use of storage space in the open-loop and closed-loop control units is obtained when the triggering unit only has to make available a storage region for a single message (reference is here made to the above-mentioned U.S. Pat. No. 5,001,642) from which the triggering message can be transmitted and in which all returned messages can be received.

Such tasks are for example typical for the diagnosis in distributed systems and network management.

In the diagnosis, a unit typically interrogates of all other units their state and error conditions. The allocation of all the messages required therefor to a common storage region whose size permits the storage precisely of the largest of these messages can then be especially simply organized when all identifiers of the affected messages in the corresponding bit positions correspond to each other beginning with the first bit of the short identifier of the triggering message up to the last bit. The bits of the long identifiers of the returned messages not fixed in this way, for example, can be used to code individual features of the units, such as their names or addresses.

In the following, the state diagrams in FIGS. 4a, 4b, 5a and 5b are explained. Each block represents a system state. The transitions between the states, which depend upon input variables and state variables, are illustrated by the directed connecting lines. The state transitions take place always with the active edge of the bus clock. With the same clock edge, output data are supplied to the bus line. The actual bus level is only scanned right in advance of the next active bus clock edge. After a BUS-IDLE state, the bus clock is synchronized to the next bus level transition from high to low. The input and state variables can be ordered and assembled to a decision vector. Compared to the state diagrams of the receiving and transmitting mode of U.S. Pat. No. 5,001,642, the state diagrams in FIGS. 4 and 5 are shown simplified in that all states and state vectors, which effect the addition and deletion of stuff bits, are omitted. In this way, the form of the decision vectors is also simplified. U.S. Pat. No. 5,001,642 is incorporated herein by reference.

The decision vector for the state diagrams in FIGS. 4a, 4b, 5a and 5b takes the following form: (BUS-MONITOR, BUS-DRIVE, COUNT, IDE, TX-REQUEST).

The above forms will now be defined:

BUS-MONITOR

Input variable which reflects the logic level scanned on the bus line.

BUS-MONITOR=0 corresponds to dominant bus level (Low).

BUS-MONITOR=1 corresponds to recessive bus level (High).

BUS-DRIVE

State variable which provides the logic level which is transmitted in this state.

BUS-DRIVE=0 corresponds to dominant transmission level (Low).

BUS-DRIVE=1 corresponds to recessive transmitting level (High).

COUNT

State variable which indicates whether the internal counter (CNTR) has run off. This counter is not necessary for all states. If needed, the counter is set during the transition into the corresponding state.

COUNT=0 corresponds to: counter has not yet run off (CNTR>0).

COUNT=1 corresponds to: counter run off (CNTR=0).

IDE

State variable which indicates as to whether a short or a long identifier is to be transmitted.

IDE=0 corresponds to: a short identifier is to be transmitted.

IDE=1 corresponds to: a long identifier is to be transmitted.

TX-REQUEST

Input variable which indicates whether a message is ready for transmission so that participation is required at the next bus arbitration procedure.

TX-REQUEST=0 corresponds to: transmission order is not present.

TX-REQUEST=1 corresponds to: transmission order is present.

With the decision vector, a clear determination is made which sequence state is entered. The state graph can therefore be described with the aid of the decision vectors. If for a specific element in the state vector, an "X" is given, then this means that the corresponding variable for the decision is not relevant (the variable can be "0" or "1").

Figure 4A:
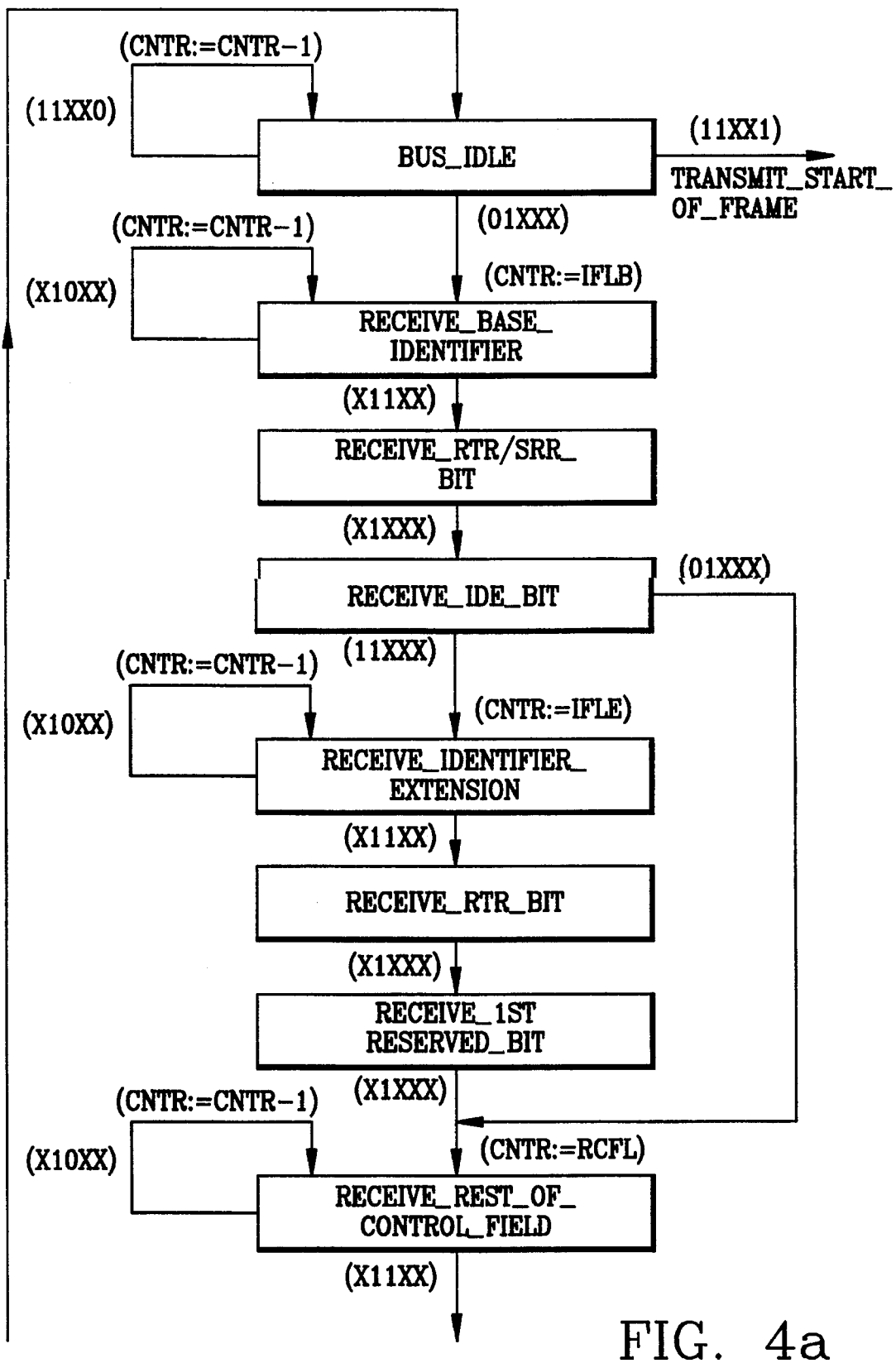
FIG. 4a is a state diagram of a possible state machine set up for the reception of messages having long identifiers as well as short identifiers.
Figure 4B:
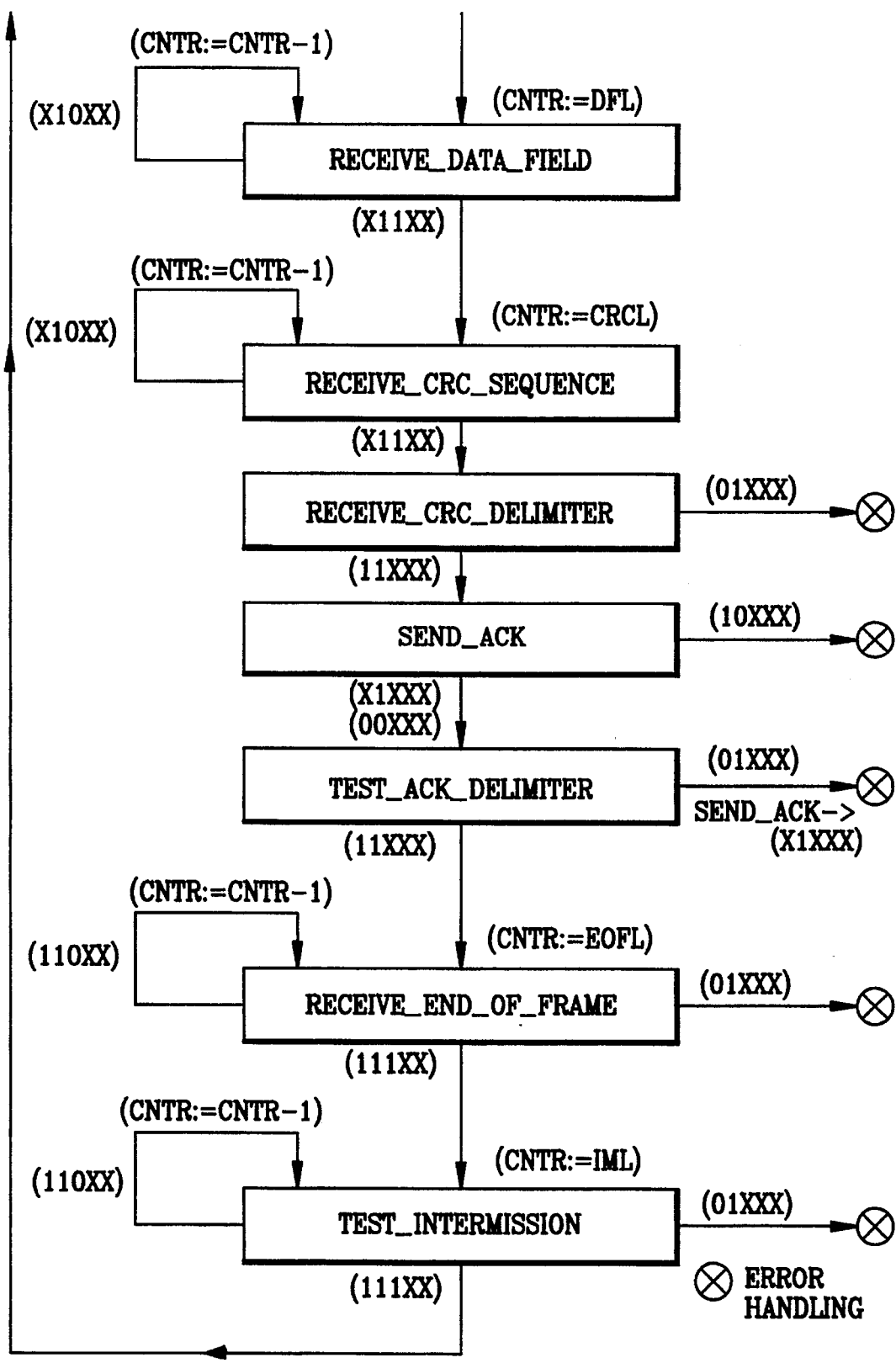

FIG. 4a shows the state diagram for receiving the message, for example, according to FIGS. 2 or 3. By means of recognizing START-OF-FRAME on the bus, the state RECEIVE-BASE-IDENTIFIER can be reached from the state BUS-IDLE. During a state transfer, the counter CNTR is preallocated with the value IFLB (IDENTIFIER-FIELD-LENGTH-BASE). The value can, for example, be IFLB=11. This value indicates how many recognition bits have been agreed to for short identifiers. With each received recognition bit, the loop of the state RECEIVE-BASE-IDENTIFIER is run through once and the counter is decremented. After the counter has run off, the system goes into the state RECEIVE-RTR/SRR-BIT and thereafter immediately into the state RECEIVE-IDE-BIT. When BUS-MONITOR=0, then the message contains a short identifier and the states RECEIVE-IDENTIFIER-EXTENSION, RECEIVE-RTR-BIT and RECEIVE-FIRST-RESERVED-BIT are skipped over. When BUS-MONITOR=1, then the state machine transfers into the state RECEIVE-IDENTIFIER-EXTENSION and the counter is preallocated with the value IFLE (IDENTIFIER-FIELD-LENGTH-EXTENSION). When for example IFLE=18, then the number of recognition bits of long identifiers exceeds the number of recognition bits of short identifiers by precisely 18. After the counter has run through, the system transfers into the sequence state RECEIVE-RTR-BIT. The control field of the CAN-protocol is 6 bits long according to the ISO-document, ISO/TC22/SC3 N 608 E. The IDE-bit replaces the first reserved bit of the control field which is noted in this document. In this way, the control field is 5 bits long in the case of short identifiers. In the case of long identifiers, the control field is in contrast 6 bits long (FIG. 3). In the case of long identifiers, the first reserved bit is handled in the state RECEIVE-FIRST-RESERVED-BIT. In this way, 5 bits remain for the case of short identifiers and also for the case of long identifiers. These are received when the state machine transfers into the state RECEIVE-REST-OF-CONTROL-FIELD. The counter CNTR is preallocated for both formats with the value RCFL=5. If all bits of the control field are received, then the data field is received next in the state RECEIVE-DATA-FIELD as shown in FIG. 4b. It is a special situation here that the counter is preallocated not with a constant but with the variable DFL (DATA-FIELD-LENGTH). DFL can, for example, assume the values 8, 16, 32 or 64. After the counter has run off, the CRC-control word (CRC-SEQUENCE) is received in the state RECEIVE-CRC-SEQUENCE. For this purpose, the counter CNTR is first preallocated with CRCL= 15(CRC-SEQUENCE-LENGTH). After the last CRC-bit is received, the state variable CRC-ERROR is set (CRC-ERROR=0 means no errors, CRC-ERROR=1 means errors in the transfer frame). The CRC-control word must always be concluded by a bit (CRC-delimiter) having the level HIGH. This is checked in the state RECEIVE-CRC-DELIMITER. For a false bus level, a transfer to error handling takes place. In the next bus clock cycle, the receivers must confirm the receipt of the message. This takes place in the state SEND-ACK by sending a low-level for error-free reception or by sending a high-level in the case of an error. When discovering the bus level high, a transfer to error handling takes place in the event that the dominant level has been set for the bus system low.

After the first acknowledge bit follows the ACK-delimiter which always must have the level high. This level is outputted by all receivers in the state TEST-ACK-DELIMITER. If the level low is received or when before a CRC-error has been determined, then there is a transfer to error handling. With the state transfer to RECEIVE-END-OF-FRAME, the counter CNTR is initialized with EOFL=7 (END-OF-FRAME-LENGTH). In the event that during RECEIVE-END-OF-FRAME the bus level low is received, then a transfer to error handling takes place. In the case where no error is present, the message now was completely received. The state TEST-INTERMISSION follows next which comprises IML=3(INTERMISSION-LENGTH). The bus level must be continuously high, otherwise, a transfer to error handling takes place. After the counter IML has run off, a transfer takes place into the sequence state BUS-IDLE with which a new receiving and transmitting cycle begins.

Figure 5A:
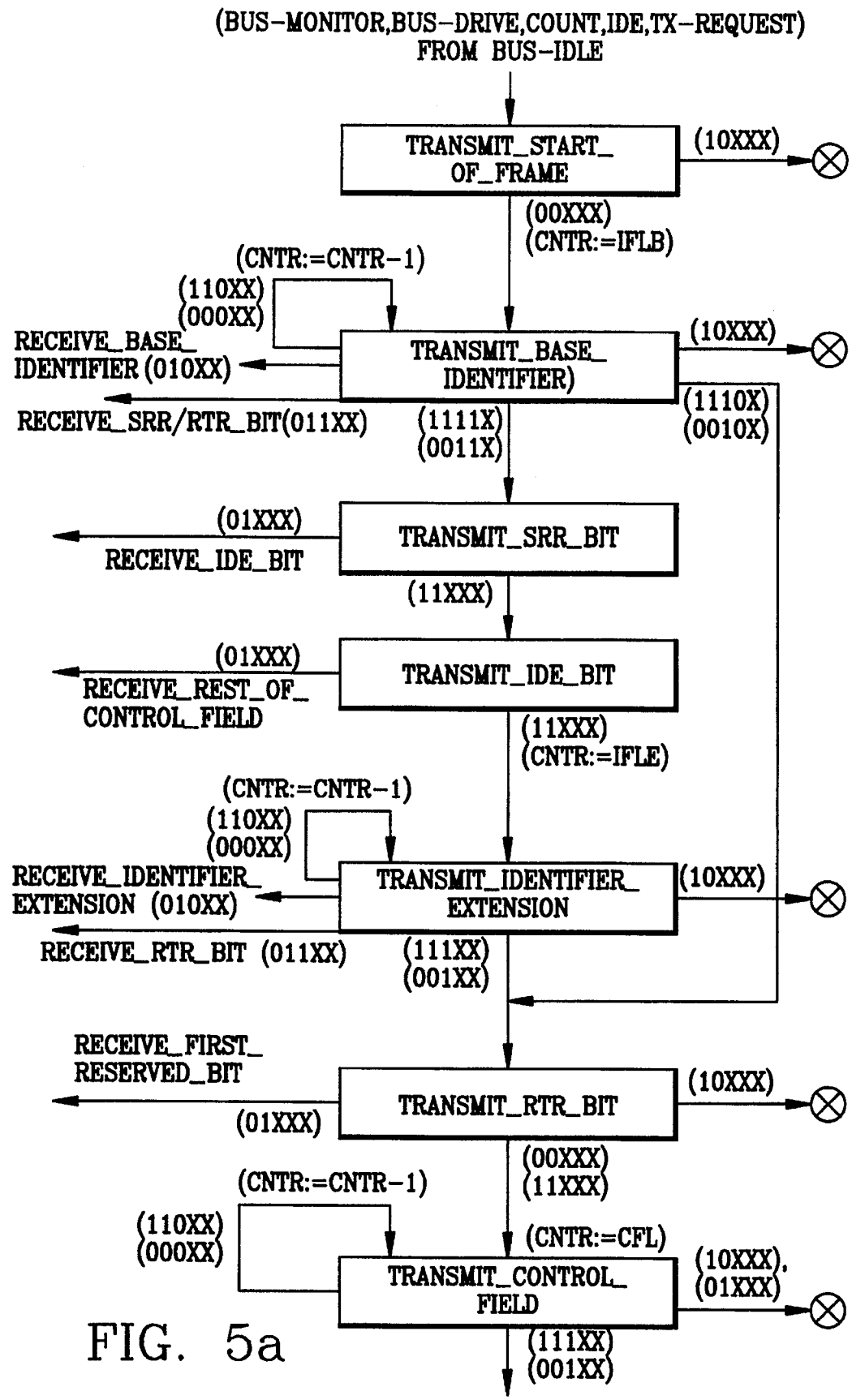
FIG. 5a is a state diagram of a possible state machine structured for the transmission of messages having long as well as short identifiers.

FIG. 5a shows the state diagram for the transmitting mode of the state machine. The transfer into the transmitting mode from the state BUS-IDLE takes place when a transmission request is received before or during BUS-IDLE (TX-REQUEST=1). For this purpose, reference may be made to the state diagram in FIG. 4a. The transmission of a message begins with the message TRANSMIT-START-OF-FRAME wherein the dominant transmitting level "0" is transmitted. In the event that a disturbance falsifies the dominant level "0" into "1", a transfer to error handling takes place. Otherwise, the bus arbitration procedure follows in the state TRANSMIT-BASE-IDENTIFIER. At the beginning, the counter CNTR is preallocated with the value IFLB (IDENTIFIER-FIELD-LENGTH-BASE). It can, for example, be IFLB=11. This value indicates how many recognition bits have been agreed to for short identifiers. The operation remains in the state TRANSMIT-BASE-IDENTIFIER (only the counter is decremented) when the received level corresponds to the transmitted level and the counter has not yet run off. The state TRANSMIT-BASE-IDENTIFIER is left when:

(a) the transmitted recessive "1"-level is overwritten by "0". The bus arbitration is then lost. When the counter has not yet run off, the sequence state is RECEIVE-BASE-IDENTIFIER and when the counter has run off, the sequence state is RECEIVE-SRR/RTR-BIT; or, (b) a transmitted dominant "0" level is falsified to "1". The sequence state is then the error handling; or, (c) for the bits of the base identifier, the received levels always correspond to the transmitted levels and the counter has run off. In this case, the arbitration is not lost up to this point.

The sequence state after TRANSMIT-BASE-IDENTIFIER is dependent upon the value of the entry IDE in the decision vector If this value is "1" that is if a message in the extended format is to be transmitted, then the state TRANSMIT-SRR-BIT follows. A recessive bit is transmitted. If a dominant bit was to be scanned, then the arbitration is lost and the state machine transfers into the state RECEIVE-IDE-BIT. The sequence state after TRANSMIT-SRR-BIT is TRANSMIT-IDE-BIT. A recessive bit is transmitted. If the arbitration is not lost to this point, then the state TRANSMIT-IDENTIFIER-EXTENSION follows. At the start, the counter is preallocated with the value IFLE (IDENTIFIER-FIELD-LENGTH-EXTENSION). The value can, for example, be IFLE=18. This value indicates by how many recognition bits a long identifier is longer than a short identifier. When the received level corresponds to the transmitted level and the counter has not yet run off, then the operation remains in the state TRANSMIT-IDENTIFIER-EXTENSION.

The state TRANSMIT-IDENTIFIER-EXTENSION is left when:

(a) the transmitted recessive "1" level is overwritten by "0". The bus arbitration is thereby lost. When the counter has not yet run off, the sequence state is RECEIVE-IDENTIFIER-EXTENSION and when the counter has run off, the sequence state is RECEIVE-RTR-BIT; or, (b) a transmitted dominant "0" level is falsified to "1". The sequence state is the error handling; or, (c) for the bits of the identifier extension, the received levels correspond to the transmitted levels and the counter has run off. In this case, the arbitration is not lost to this point.

When the arbitration is not lost to this point or when the entry IDE in the decision vector is "0" during the state TRANSMIT-BASE-IDENTIFIER, then the sequence state is TRANSMIT-RTR-BIT. The RTR-BIT can be transmitted dominantly or recessively. If a recessively transmitted bit is overwritten by a dominantly transmitted bit, then the bus arbitration is lost and the state RECEIVE-FIRST-RESERVED-BIT is assumed next. In the other cases up to the transfer to error handling, the sequence state is TRANSMIT-CONTROL-FIELD. With the entry into the state TRANSMIT-CONTROL-FIELD, the counter CNTR is initialized with CFL=6 (CONTROL-FIELD-LENGTH). Since the bus arbitration is ended, from this point on, the transmitting level and receiving level must always be the same with the exception of the bit received in the state RECEIVE-ACK. If this is not the case, then there is a transfer to error handling. When the counter has not run off and for a edge exchange within the last five-clock cycles, the system remains in the state TRANSMIT-CONTROL-FIELD and only the counter is decremented. The operations in the state TRANSMIT-CONTROL-FIELD apply also to the states TRANSMIT-DATA-FIELD and TRANSMIT-CRC-SEQUENCE (see FIG. 5b). When entering into TRANSMIT-DATA-FIELD, the counter CNTR is preallocated with the variable DFL (DATA-FIELD-LENGTH) which can assume the values 0, 8, 16, 24, 32, 40, 48, 56 or 64. With entry into TRANSMIT-CRC-SEQUENCE, the counter is preallocated with the constant CRCL=15(CRC-FIELD-LENGTH). The CRC-delimiter must be transferred after the CRC-sequence. This takes place in the state TRANSMIT-CRC-DELIMITER. In the event that the transmitted high state is falsified to low, a transfer to error handling takes place. The acknowledge-bit is checked next. A received high level means that no station has received the message without error or that all stations have an incorrect frame synchronization. The transmitter therefore supplies an error frame for the error handling. A transfer into the sequence state TEST-ACK-DELIMITER takes place when the low level is received. The ACK-DELIMITER must always be high. If this is not the case, then a jump to error handling takes place. The message end is transmitted in the state TRANSMIT-END-OF-FRAME. Since end-of-frame comprises 7 high bits, the counter CNTR is preallocated with EOFL=7 (END-OF-FRAME-LENGTH). The system remains in the state TRANSMIT-END-OF-FRAME when a high level is received until the counter has run off and then transfers to TEST-INTERMISSION. If a low level is received, there is a transfer to error handling. The transmission mode is ended with the transfer into the state TEST-INTERMISSION. The state TEST-INTERMISSION is identical to that described in the receive mode.

Figure 6:
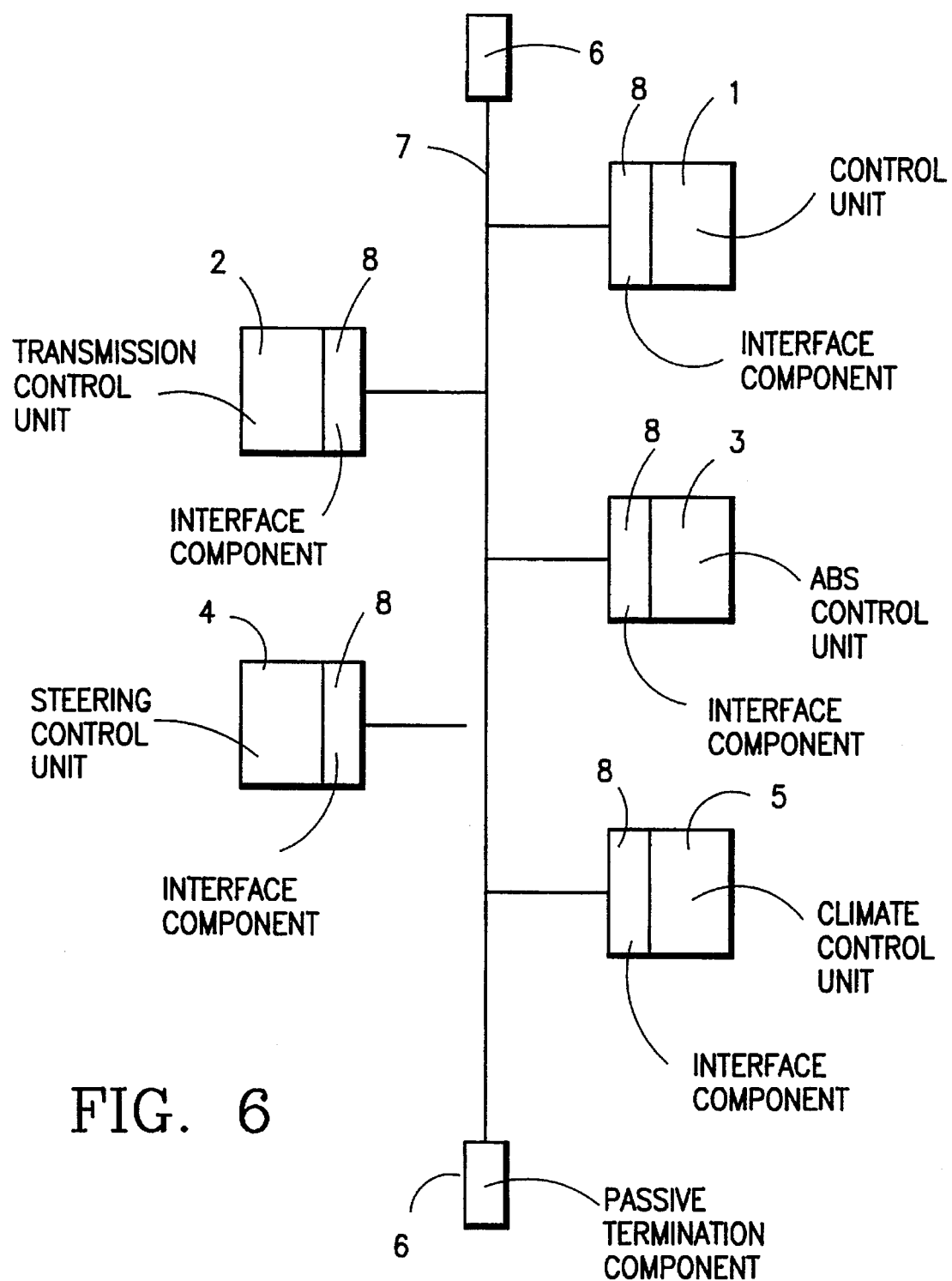
FIG. 6 is a schematic of a data-processing system having a linear by structure for use in a motor vehicle; and, FIG. 7 is a block diagram of a CAN-controller.

FIG. 6 is a schematic of a data processing system for use in a motor vehicle having several control apparatus operating at different locations and which are interconnected via a linear bus structure. The control apparatus are: an engine control unit 1, a transmission control unit 2, an ABS-control unit 3, a steering control unit 4 and a climate control unit 5. Each of the control units has an interface component 8. A possible interface control unit 8 can, for example, be a CAN-controller which can carry out the data transmission according to the CAN-protocol. The interface component 8 must therefore be able to process message formats for long and short formats.

Each interface component 8 is connected to the bus line 7. A passive termination component 6 is disposed at the ends of the bus line 7 as a termination thereof. The messages having the formal structure as shown in FIGS. 1 to 3 are transmitted on this bus line 7. In this way, for example, the engine control unit 1 can detect the engine speed of the motor vehicle in which the data processing system is utilized and can transmit this engine speed with the aid of a message having the structure shown in FIG. 2 to the transmission control unit 2 via the bus line 7.

Another example is the detection of the engine temperature by the engine control unit 1. This measurement variable is also of significance for the climate control unit 5 and can therefore likewise be transmitted to the climate control unit 5 with the aid of a message. Since temperature changes as a rule occur slower than changes in engine speed, the messages for transmitting temperature data are transmitted only with a lower priority than the messages for transmitting engine speed data. In this way, the message which transmits the engine temperature data can be transmitted with a formal structure as shown in FIG. 3.

For data transmission, that station which wishes to transmit data, sends a transmission request to the interface component 8 corresponding thereto. The interface component 8 which is addressed then carries out the transmission command independently and thereafter issues a transmission announcement to the station. The transmission announcement can contain the successful execution of the transmission command as well as possible error messages.

Figure 7:
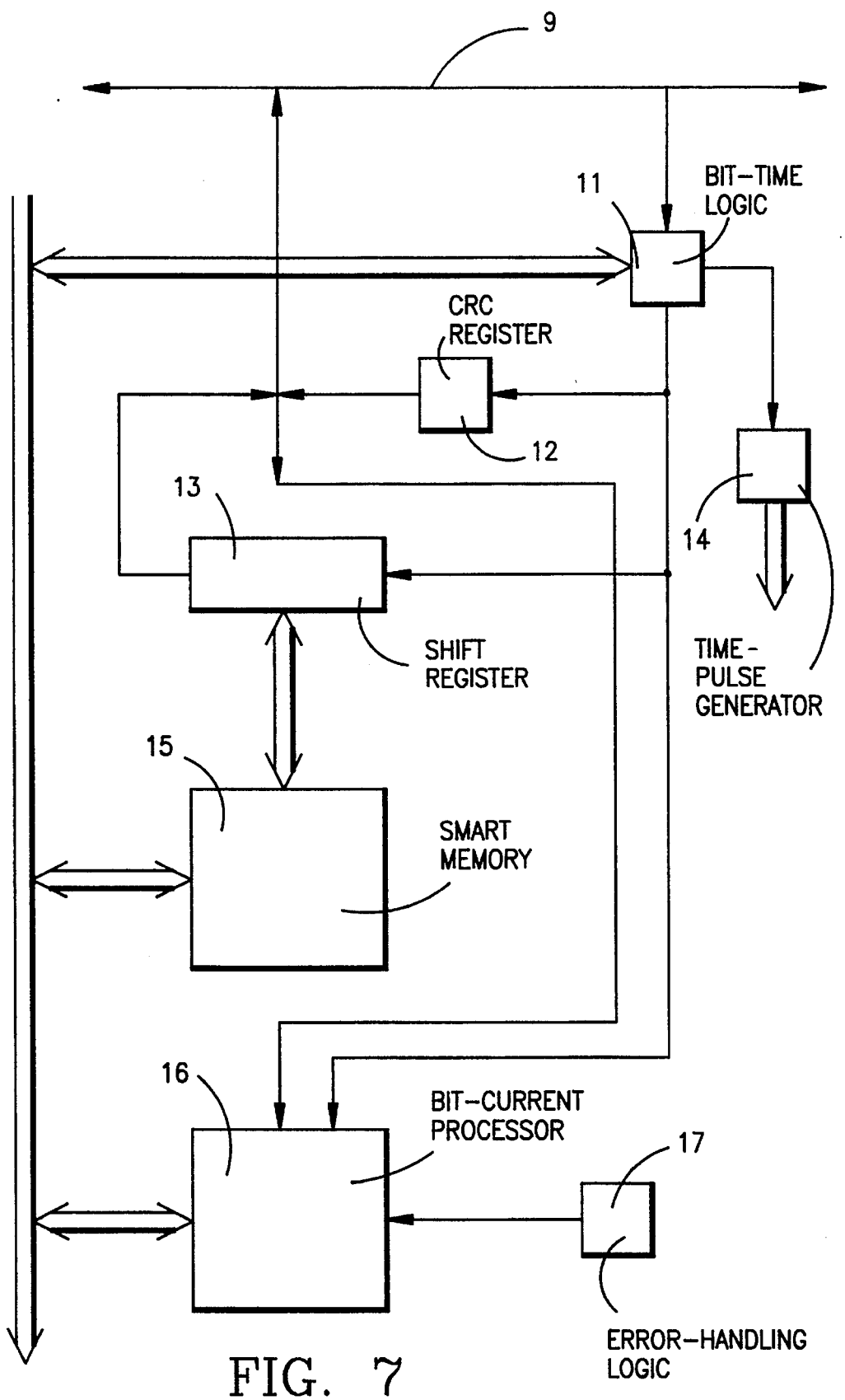

FIG. 7 shows a block diagram of a CAN-controller as an example for an interface component 8. This CAN-controller is configured for carrying out the CAN-protocol. The CAN-controller therefore serves as a state machine which operates as described with respect to FIGS. 4a, 4b, 5a and 5b. The bus line 9 is connected to the bit-timing logic (BTL) 11. From logic 11, connecting lines lead to the CRC-register 12, shift register 13, lock generator 14 and bit-stream processor (BSP) 16. Furthermore, the bit-timing logic 11 is connected via a bidirectional bus to the system bus of the station. The system bus makes possible the exchange of data/commands/ status messages between the CPU and the interface component 8 of a station.

A connecting line leads from the CRC-register 12 to the bit-stream processor 16. A connecting line extends from the shift register 13 to the bus line. A smart memory 15 is connected via a bidirectional bus to the shift register 13 and to the system bus of the station. The bit-stream processor 16 is likewise connected to the system bus of the station via a bidirectional bus. Furthermore, an error-management logic (EML) 17 is contained in the CAN-controller and is connected via a connecting line to the bit-current processor 16. Additional connecting lines extend from the clock generator 14 to all control components of the CAN-controller.

The bit-timing logic 11 makes a logic available with which the bit times for the data transmission via the CAN-bus can be generated. The bit-time logic 11 is configured as a programmable unit with which system parameters are adjustable, such as the baud rate, the compensation of the propagation delay of the bus line 7 and the phase shift to adjust the sample point during a bit-timing. The bit-time logic 11 likewise carries out the bus level scanning in dependence upon the adjusted system parameters and supplies the state variable BUS-MONITOR.

A further task of the bit-timing logic 11 is the synchronization of the bus level scanning of an interface component 8 to a recessive/dominant edge, with a start-of-frame bit and for each further recessive/dominant edge when the interlace component 8 itself does not transmit a dominant bit at the same time. The CRC-register 12 generates the CRC-code of the message and inserts this code into the message after the data bits. Furthermore, the CRC-register 12 carries out the check of the CRC-code of a received message. If required, an error message can then be emitted to the bit-stream processor 16. The shift register 13 makes possible the serial transmission/reception of data. The smart memory 15 can operate in parallel on the data in the shift register. This is necessary, for example, for the acceptance test with the aid of the identifier of the received message. The clock generator 14 generates the time signals (system clock, bit-timing clock, etcetera) for the various operations in the interface component 8. The smart memory 15 affords place for 15 transmit/receive objects with each object comprising an identifier, control bits and data bits and with each object being 8 bytes long. After the initialization, the memory can carry out reception and transmission of data without further CPU-actions. The memory furthermore contains the interrupt-registers having corresponding control logic so that, for example, after the corrected reception of messages, an interruption request can be conducted via the system bus to the CPU of the station. The smart memory furthermore carries out the acceptance test of the received messages. The error-management logic 17 is responsible for the error handling in the CAN-controller.

The error-management logic includes means for setting up an error statistic for the reception and transmission operations. The state of the CAN-controller is adjusted in dependence upon this error statistic. The bit-stream processor 16 controls the operation of the data stream between shift register 13, CRC-register 12 and the bus line 9. The bit-stream processor likewise controls the parallel data traffic between shift register 13 and the smart memory 15 so that the operations of reception, arbitration, transmission and error detection can be carried out corresponding to the CAN-protocol. A further task of the bit-stream processor 16 is the automatic repeat transmission of messages which are transmitted with errors because of external influences or noise effects. The bit-stream processor 16 contains the state registers which can be interrogated via the system bus by the CPU of the station.

It is understood that the foregoing description is that of the preferred embodiments of the invention and that various changes and modifications may be made thereto without departing from the spirit and scope of the invention as defined in the appended claims.

What is claimed is:

1. A method of structuring messages for exchanging data and/or for synchronizing processes in a multimaster data processing bus system wherein at least two stations are connected to each other via a serial bus and wherein the messages are to have a priority relative to each other, the method comprising the steps of:

structuring at least two of said messages to include at least a start element (start bit, SOF), an identifier, a data element and an end element (EOF);

structuring said identifier to fix the data to be transmitted with the message and to fix the priority of the message determining access to the bus;

structuring one of said two messages to be a first type wherein the identifier thereof is a short identifier and structuring the other one of said two messages to be a second type wherein the identifier thereof is a long identifier;

allowing said first and second types of messages to be exchanged between said at least two stations;

providing at least one bit field (IDE-field) in each of said first and second types of messages with said bit field having at least one bit; and, entering data into said bit field for selecting one of said at least two possible identifier lengths and for deciding whether said first type of message having the short identifier or said second type of message having the long identifier gets priority to said bus in case there is correspondence of a first number of bits of said long identifier with the corresponding bits of said short identifier.

2. The method of claim 1, wherein one of said messages includes bits, which in the case of short identifiers, are used for a decision as to bus access; and, wherein said IDE-field for characterizing the length of the identifier is included in said bits.

3. The method of claim 1, wherein said IDE-field for characterizing the length of the identifier assumes the same position in all messages.

4. The method of claim 1, wherein one of said messages is a CAN-message having reserved bits; and, wherein said IDE-field for characterizing the length of the identifier utilizes one of the reserved bits of the CAN-message.

5. The method of claim 1, wherein one of said messages includes a bit combination with respect to a decision as to bus arbitration access; and, said bit combination includes identifier bits covering priority space and/or name space and at least one further bit having a priority which can be changed.

6. The method of claim 5, wherein the value of said at least one further bit (IDE-Bit, SRR-Bit) of said one message is determined by the priority of a particular identifier, independently of the identifier length, when two messages having short identifiers or when two messages having long identifiers are transmitted simultaneously.

7. The method of claim 5, wherein the value of said at least one further bit (IDE-Bit, SRR-Bit) of said one message is so selected that, when there is correspondence of a first number of bits of a long identifier with the corresponding bits of a short identifier, the message having the short identifier has priority, and the number of bits being determined by the length of the short identifier.

8. The method of claim 5, wherein at least one changeable bit is transmitted recessively.

9. The method of claim 5, wherein the one changeable bit is determined to be dominant or recessive for all messages.

10. The method of claim 1, wherein said data processing system is operated pursuant to a CAN-protocol and the IDE-field has one bit and is set to be dominant for selecting short identifiers in messages which are compatible to the CAN-protocol and is set recessively in messages with long identifiers.

11. The method of claim 5, wherein at least one further bit is set recessively in messages having long identifiers (SRR-Bit).

* * * * *

UNITED STATES PATENT AND TRADEMARK OFFICE
CERTIFICATE OF CORRECTION

PATENT NO. : 5,524,213
DATED : June 4, 1996
INVENTOR(S) : Siegfried Dais and Jan Unruh It is certified that error appears in the above-indentified patent and that said Letters Patent is hereby corrected as shown below:

In column 1, between lines 9 and 10 please insert
-- BACKGROUND OF THE INVENTION --.

In column 2, line 60, please delete "by" and substitute
-- bus -- therefor.

In column 7, line 67, between "vector" and "If", please insert -- . --.

In column 7, line 67, between ""1"" and "that" and between "is" and "if", please insert -- , --.

In column 9, line 62: delete "lock" and substitute
-- clock -- therefor.

In column 10, line 25: delete "interlace" and substitute
-- interface -- therefor.

Signed and Sealed this

Thirtieth Day of September, 1997

Attest:

BRUCE LEHMAN

*Attesting Officer*   *Commissioner of Patents and Trademarks*